United States Patent
Han et al.

(10) Patent No.: US 12,235,682 B2
(45) Date of Patent: Feb. 25, 2025

(54) DISPLAY DEVICE INCLUDING A MAIN DIGITIZER AND A SUB-DIGITIZER

(71) Applicant: SAMSUNG DISPLAY CO., LTD., Yongin-si (KR)

(72) Inventors: Chan Hui Han, Seongnam-si (KR); Sang Hyo Park, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 157 days.

(21) Appl. No.: 17/903,224

(22) Filed: Sep. 6, 2022

(65) Prior Publication Data

US 2023/0236634 A1 Jul. 27, 2023

(30) Foreign Application Priority Data

Jan. 27, 2022 (KR) .......................... 10-2022-0012353

(51) Int. Cl.
*G09G 1/16* (2006.01)
*G06F 1/16* (2006.01)

(52) U.S. Cl.
CPC .......... *G06F 1/1643* (2013.01); *G06F 1/1624* (2013.01); *G06F 1/1652* (2013.01)

(58) Field of Classification Search
CPC ..... G06F 1/1643; G06F 1/1624; G06F 1/1652
See application file for complete search history.

(56) References Cited

U.S. PATENT DOCUMENTS

| | | | |
|---|---|---|---|
| 2011/0018820 A1* | 1/2011 | Huitema | G06F 1/1616 345/173 |
| 2012/0276958 A1* | 11/2012 | Inami | H04M 1/0241 455/566 |
| 2013/0128439 A1* | 5/2013 | Walters | G06F 1/1624 361/679.04 |
| 2013/0321244 A1* | 12/2013 | Ono | G06F 3/1446 345/1.3 |
| 2015/0002398 A1* | 1/2015 | Nakhimov | G06F 1/1652 345/173 |
| 2017/0208157 A1* | 7/2017 | Kim | H04M 1/0268 |
| 2017/0357473 A1* | 12/2017 | Kim | G06F 1/1681 |
| 2020/0267838 A1* | 8/2020 | An | H05K 5/0004 |

FOREIGN PATENT DOCUMENTS

| | | |
|---|---|---|
| KR | 10-2018-0025358 | 3/2018 |
| KR | 10-2020-0084495 | 7/2020 |
| KR | 10-2020-0115940 | 10/2020 |
| KR | 10-2021-0000359 | 1/2021 |

* cited by examiner

*Primary Examiner* — Sanghyuk Park
(74) *Attorney, Agent, or Firm* — F. CHAU & ASSOCIATES, LLC

(57) ABSTRACT

A display device includes: a display panel including a flat area and a first sliding area adjacent to the flat area in a first direction and configured to slide in the first direction; a main digitizer disposed on the flat area of the display panel; a first sub-digitizer disposed on the main digitizer and partially overlapping with the main digitizer in a thickness direction; and a flexible printed circuit board electrically connecting the main digitizer with the first sub-digitizer.

20 Claims, 14 Drawing Sheets

[Fig. 1]
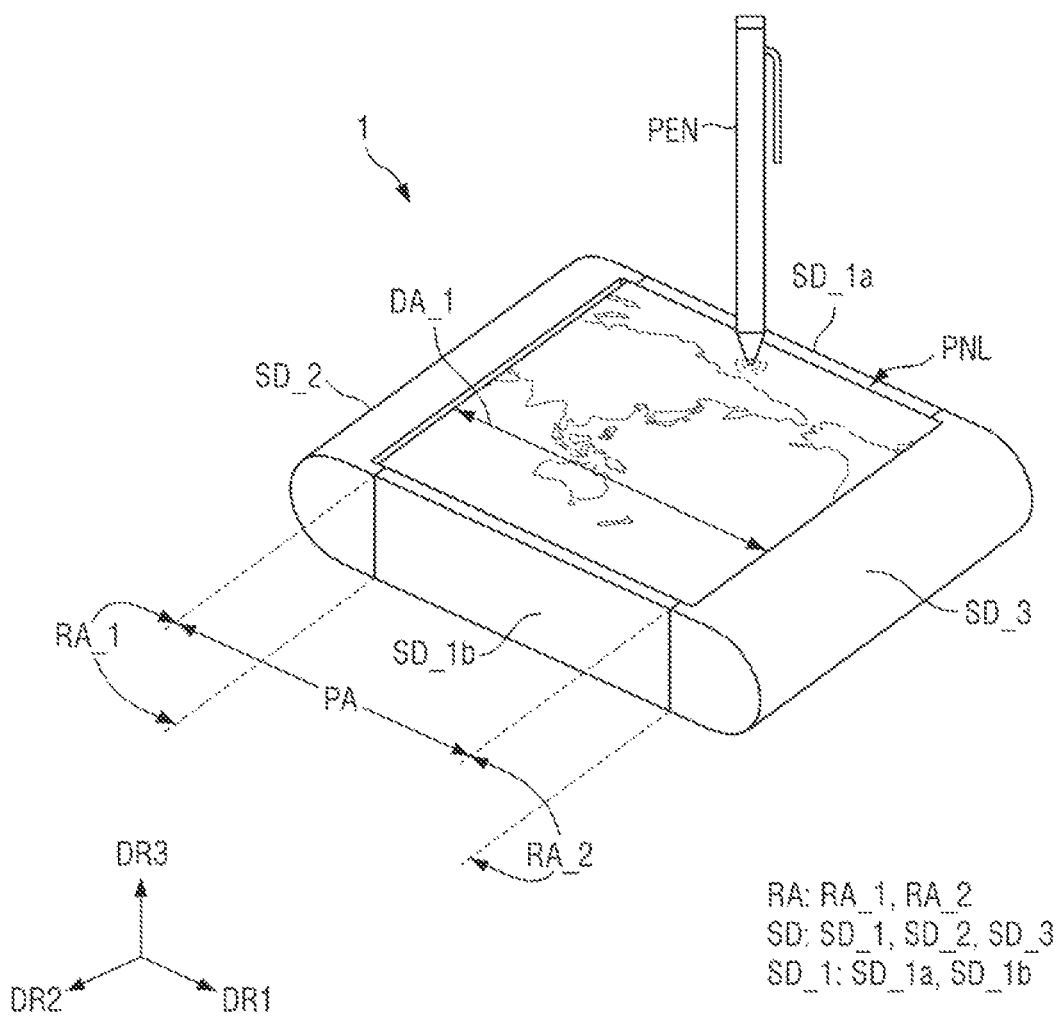

[Fig. 2]
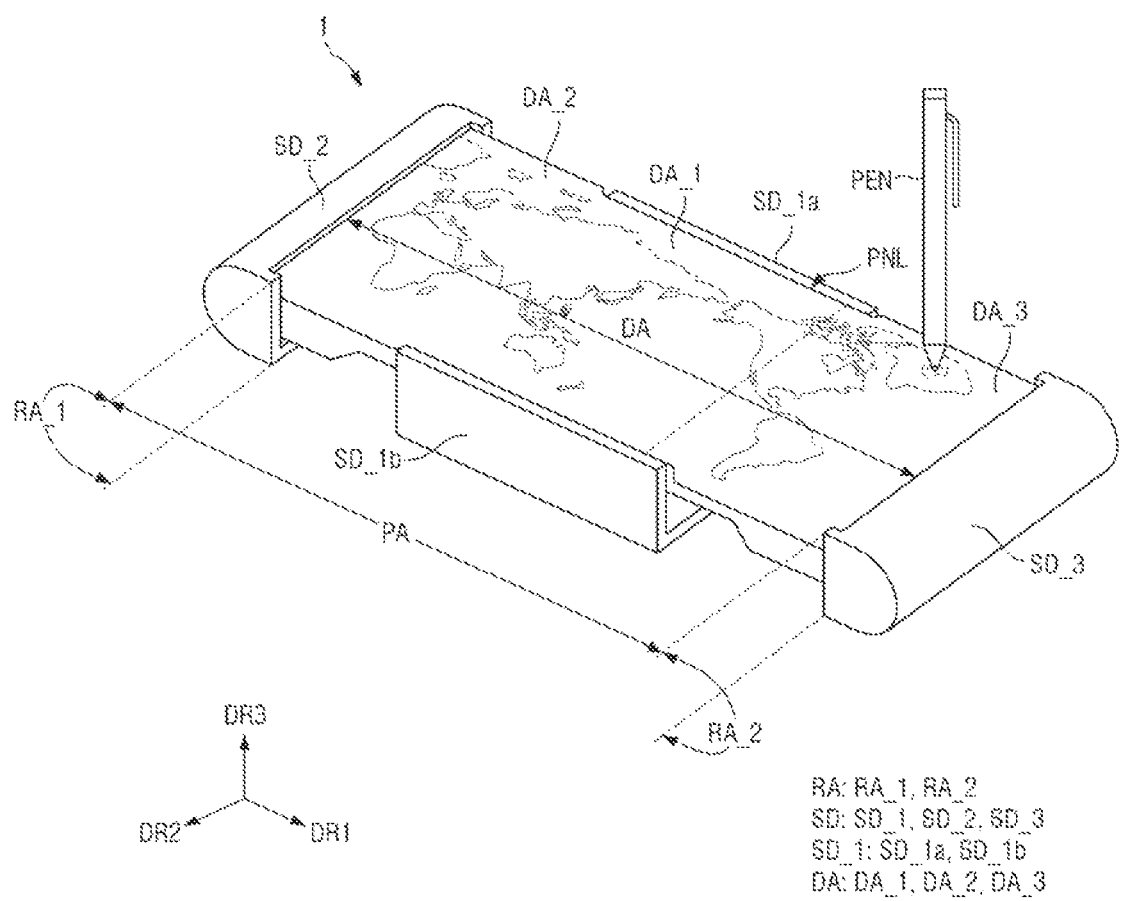

[Fig. 3]
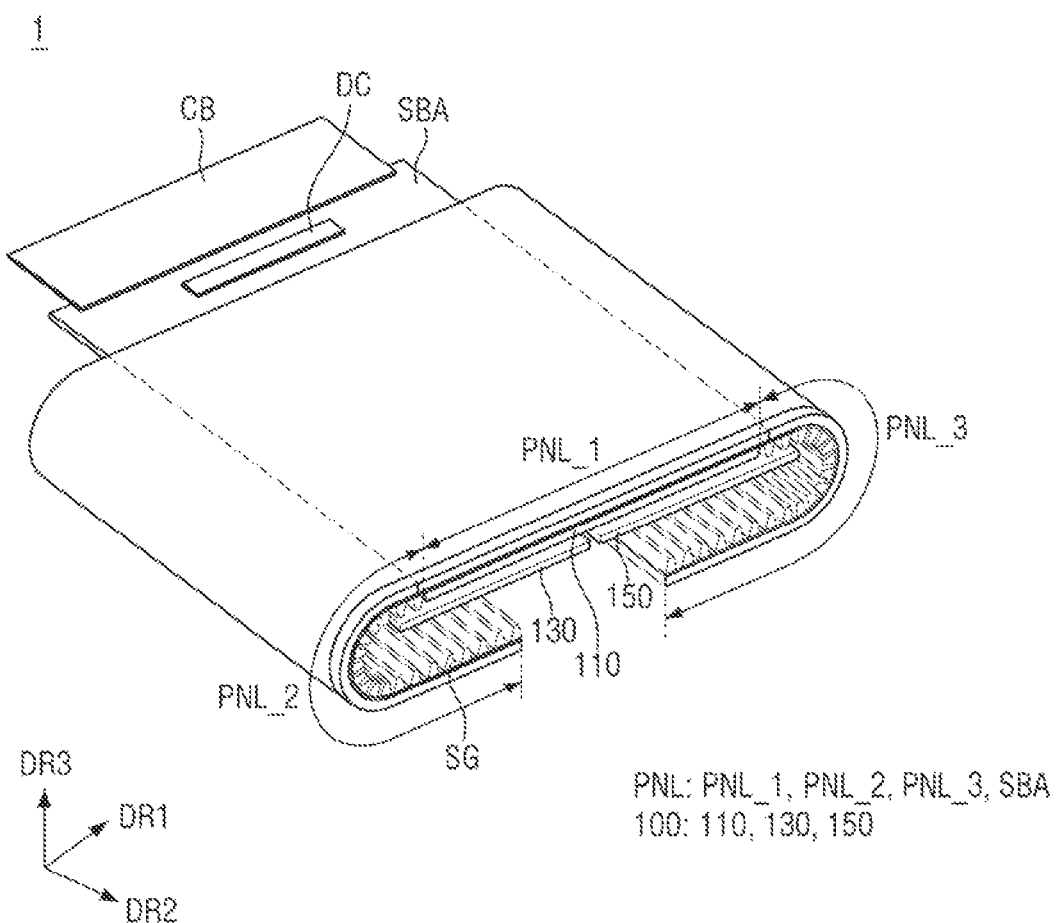

[Fig. 4]
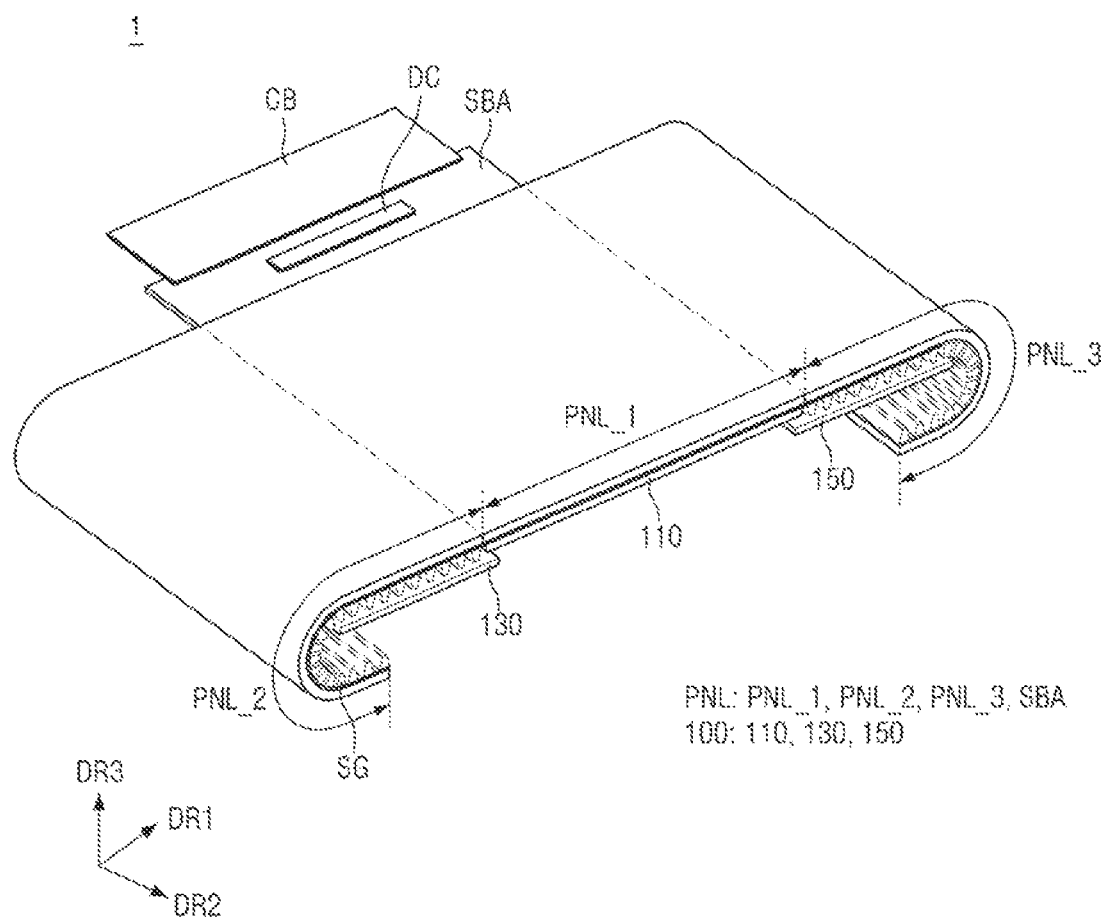

[Fig. 5]
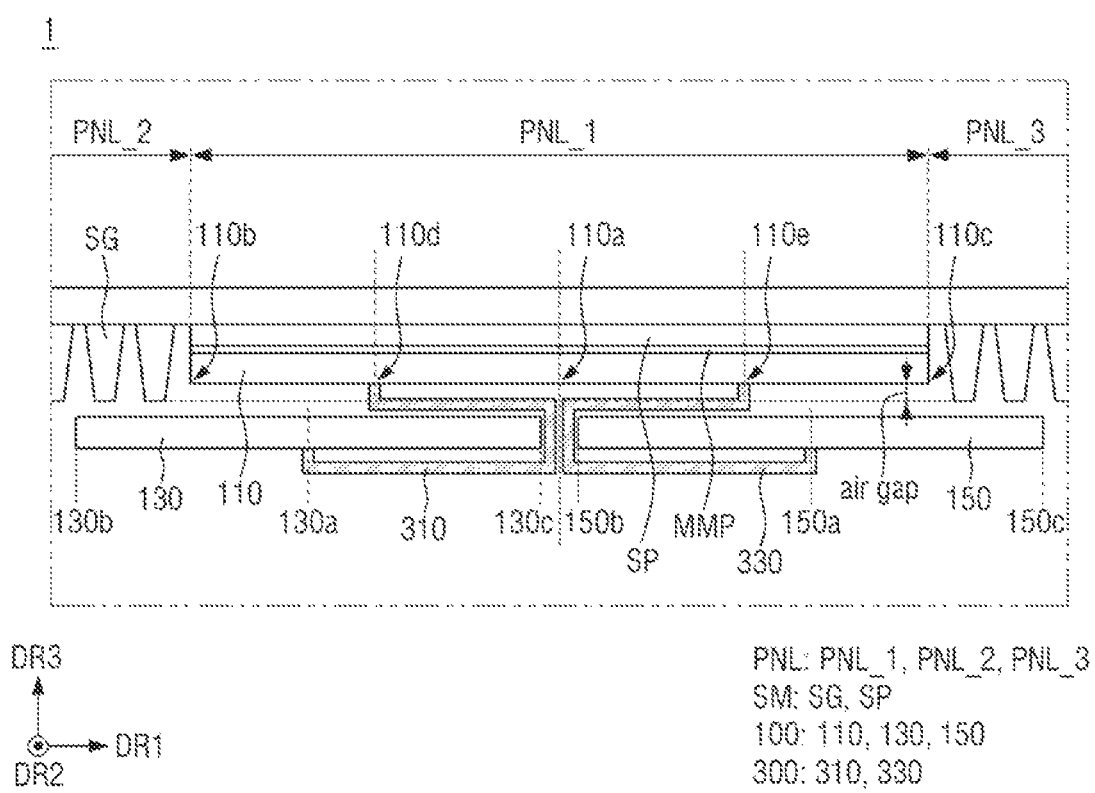

[Fig. 6]
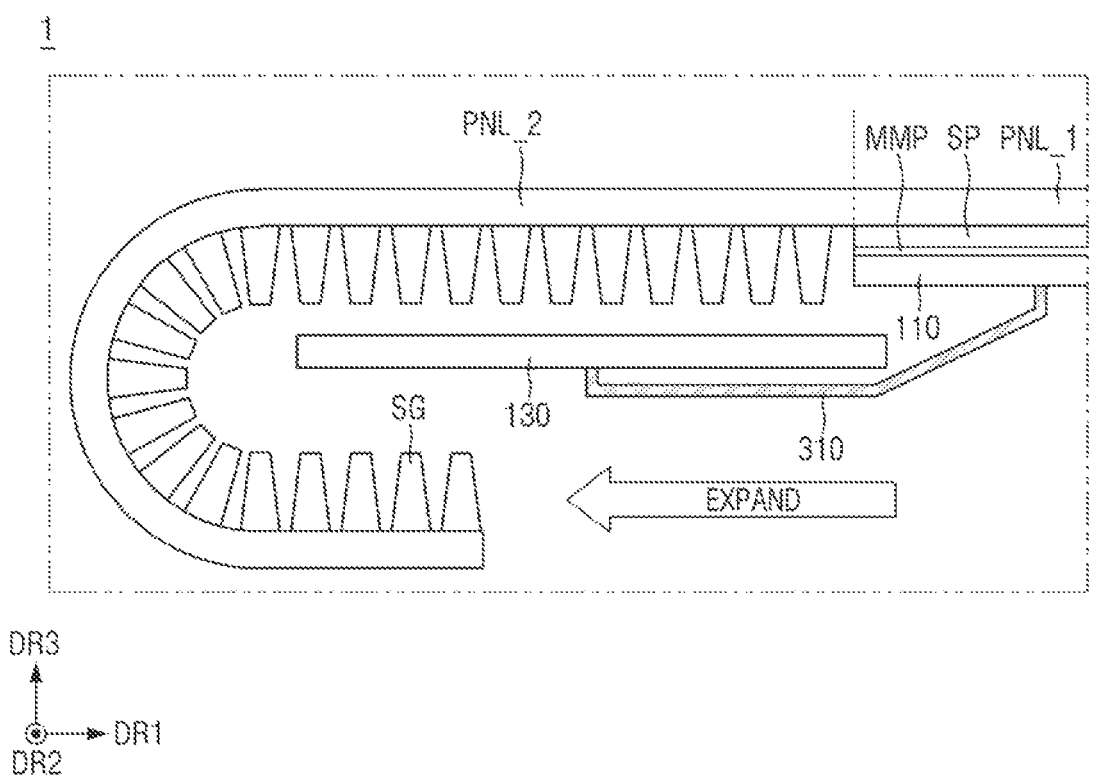

[Fig. 7]
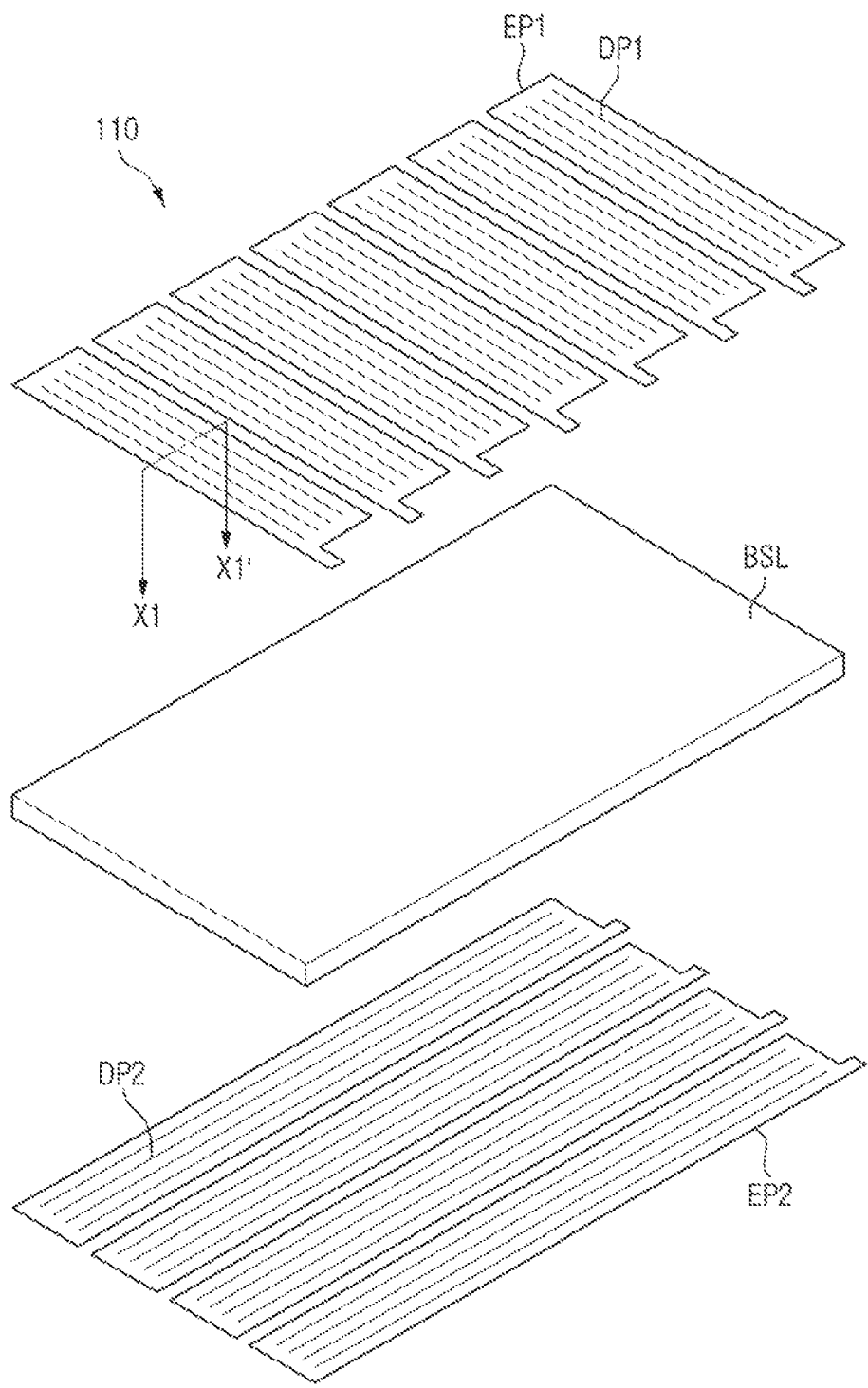

[Fig. 8]
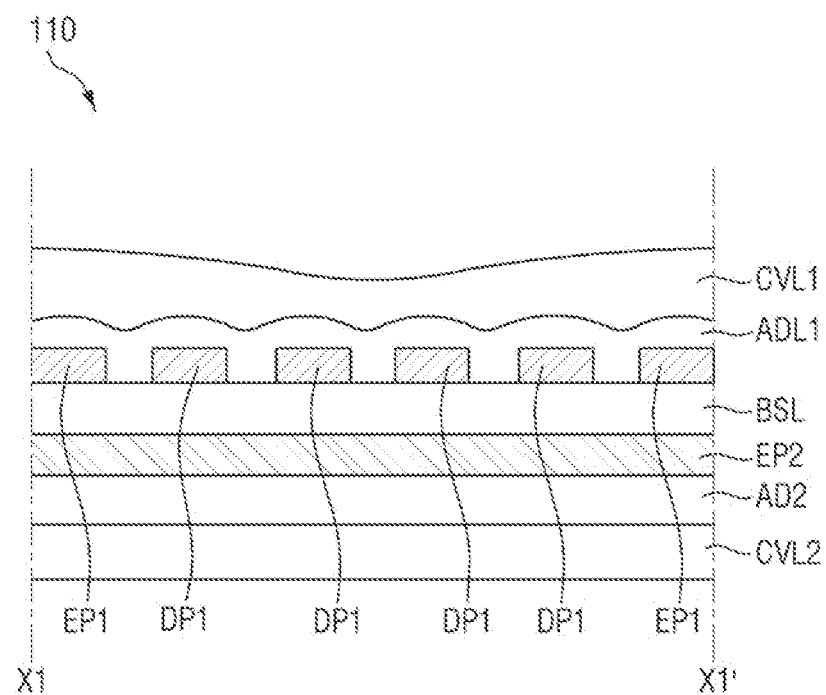

[Fig. 9]
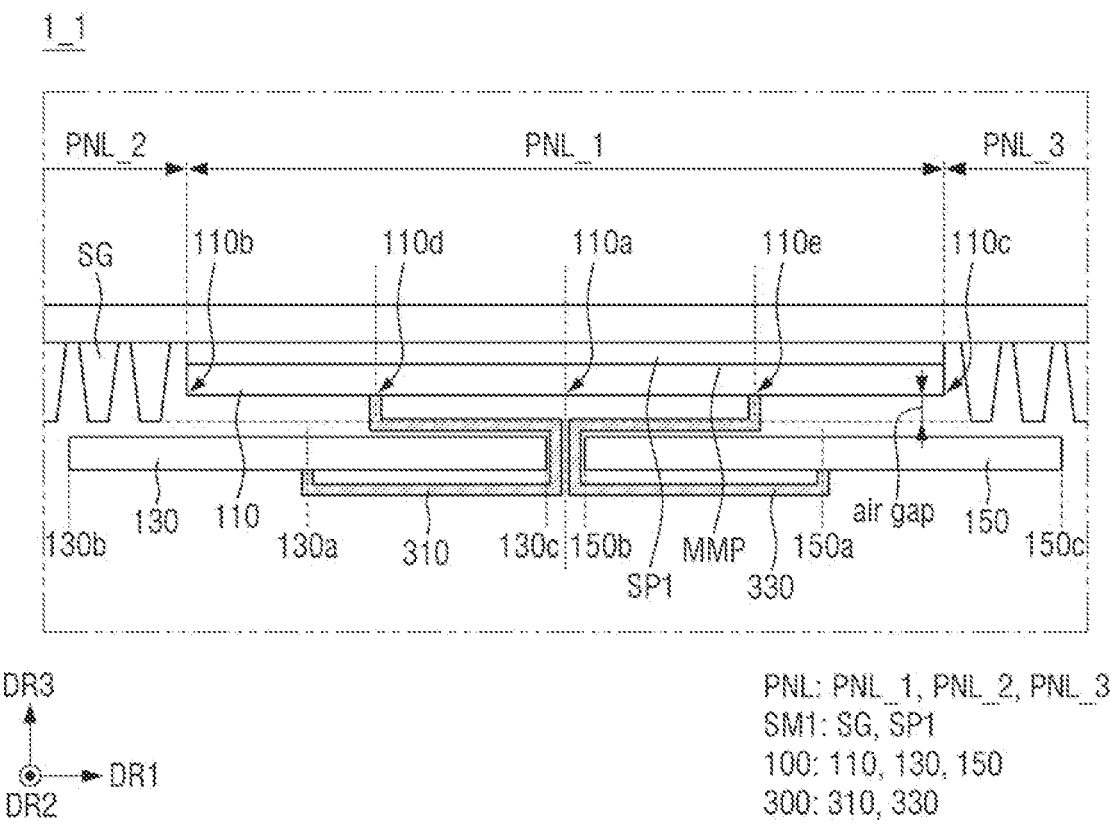

[Fig. 10]
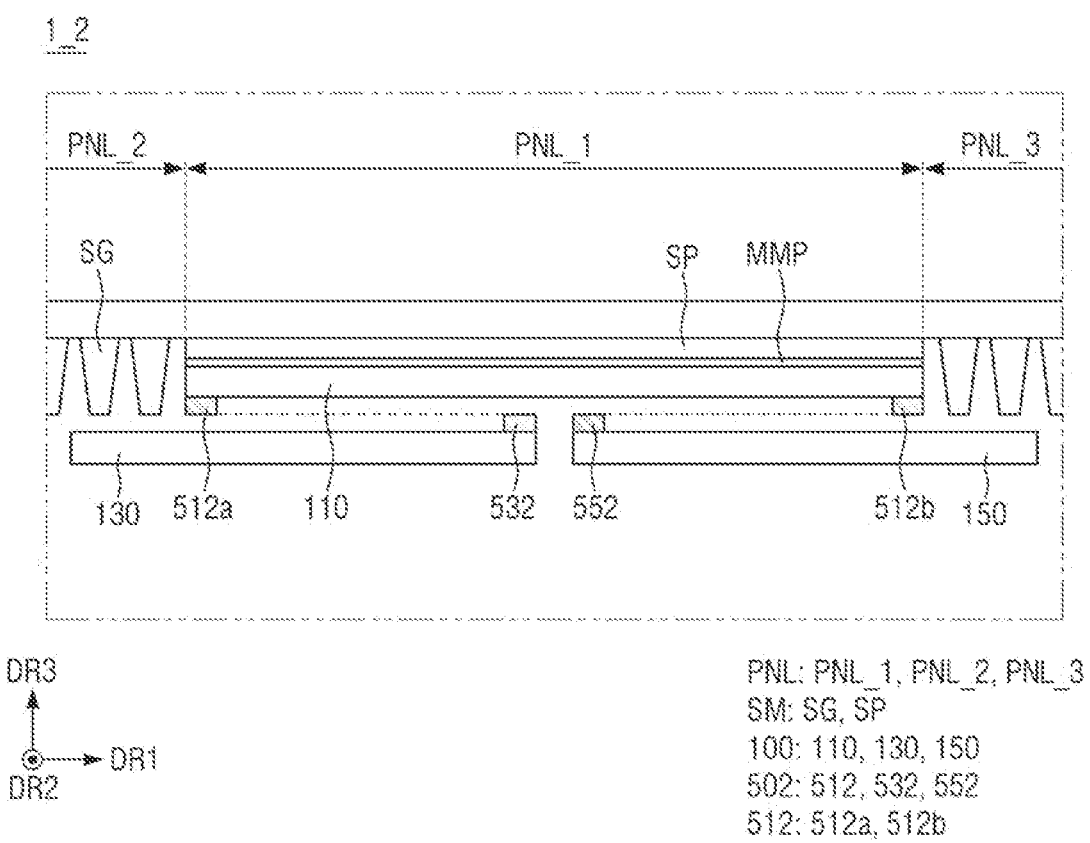

[Fig. 11]
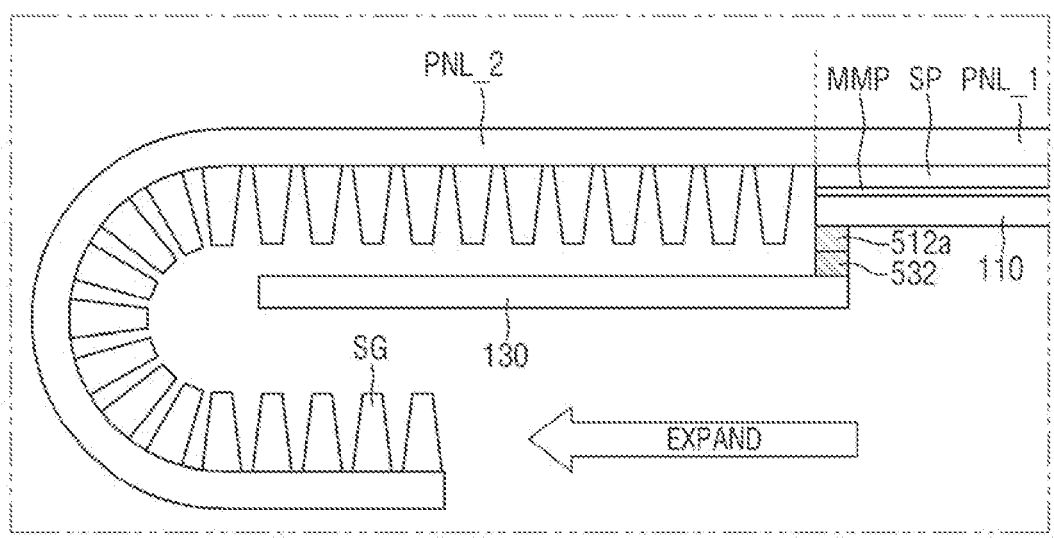
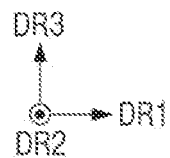

[Fig. 12]
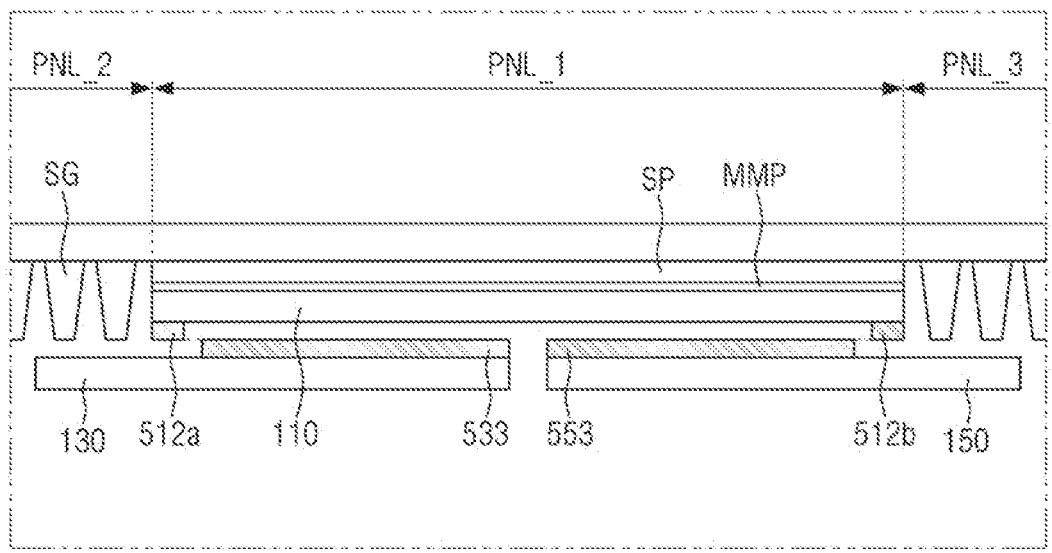

[Fig. 13]
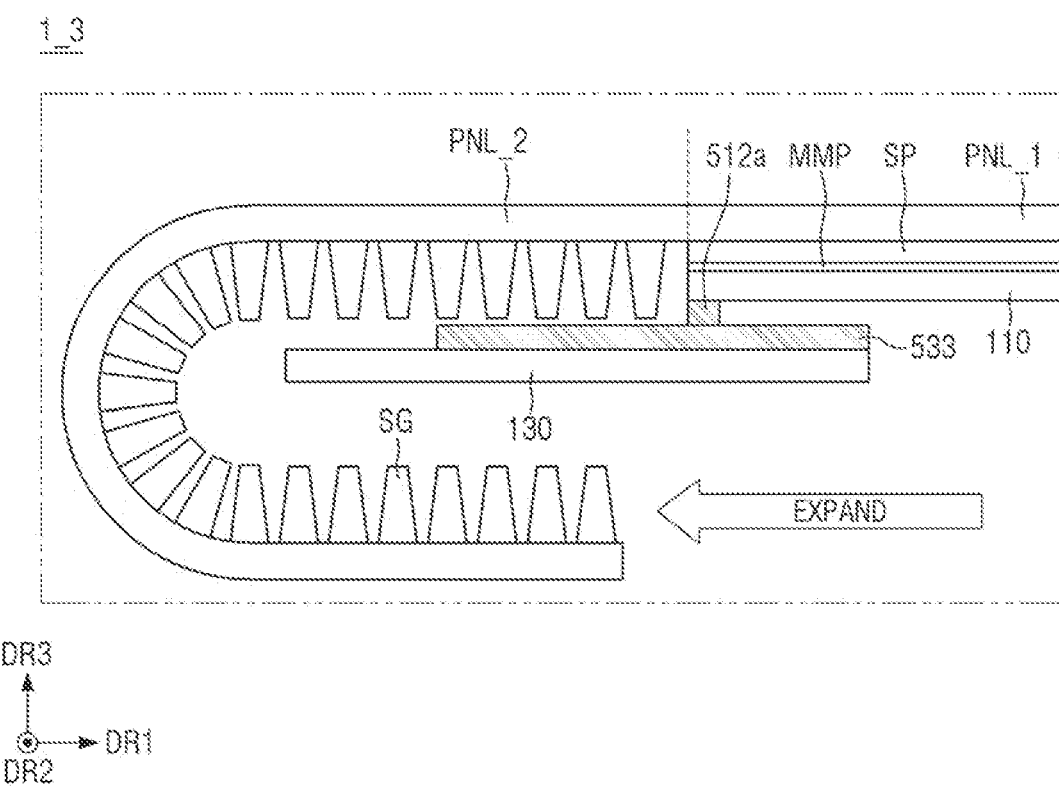

[Fig. 14]
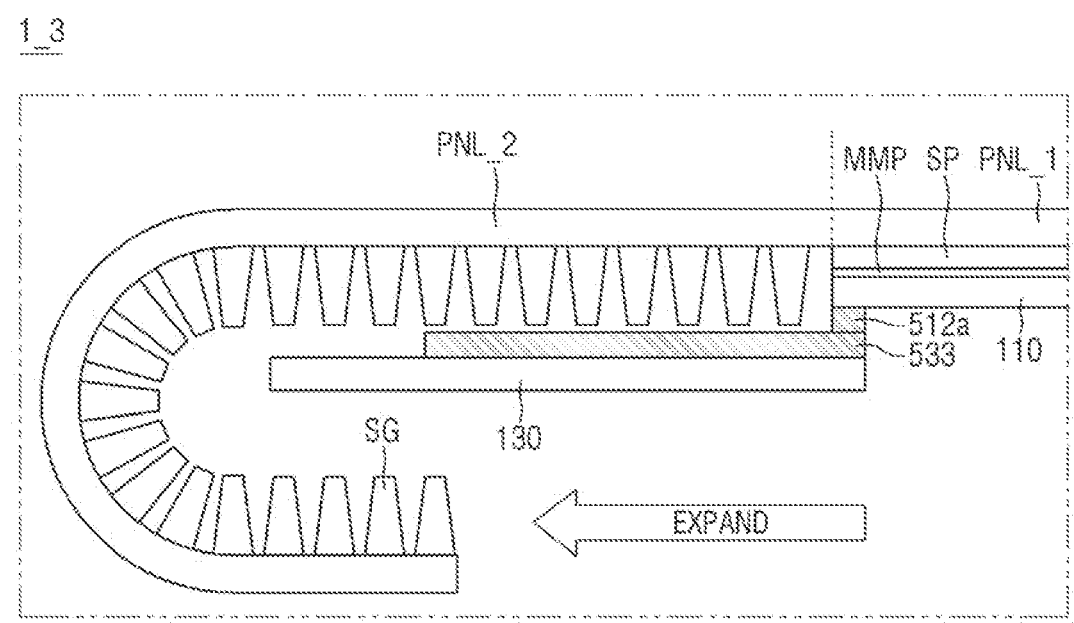

DISPLAY DEVICE INCLUDING A MAIN DIGITIZER AND A SUB-DIGITIZER

CROSS-REFERENCE TO RELATED APPLICATION

This application claims priority under 35 U.S.C. § 119 to Korean Patent Application No. 10-2022-0012353 filed on Jan. 27, 2022 in the Korean Intellectual Property Office, the disclosure of which is incorporated by reference herein in its entirety.

TECHNICAL FIELD

The present invention relates to a display device, and more particularly, to a slidable display device.

DISCUSSION OF THE RELATED ART

Display devices increasingly become more important as multimedia technology further develops. Accordingly, a variety of types of display devices such as organic light-emitting display (OLED) devices and liquid-crystal display (LCD) devices are currently used.

In addition, recent display devices generally support touch input from, for example, an electronic pen (e.g., a stylus pen) as well as a touch input from a part of a user's body (e.g., a finger). By receiving a touch input from an electronic pen, the display device can sense the touch input more precisely than a display device receiving a touch input from a part of the user's body.

Recently, as the display technology evolves, a display device having a flexible display are continuously under development. The display screen of a flexible display can be, for example, extended or reduced by folding, bending or sliding the display screen, thereby contributing greatly to the reduction of the volume or the design change of the display device.

SUMMARY

Aspects of the disclosure provide a display device that allows for touch input using an input device such as an electronic pen.

It should be noted that objects of the disclosure are not limited to the above-mentioned object, and other objects of the disclosure will be apparent to those skilled in the art from the following descriptions.

According to embodiments of the present invention, a touch input can be made on a display device by using an input device such as an electronic pen.

It should be noted that effects of the present invention are not limited to those described above, and other effects of the present invention will be apparent to those skilled in the art from the following descriptions.

According to an embodiment of the present invention, a display device includes: a display panel including a flat area and a first sliding area adjacent to the flat area in a first direction and configured to slide in the first direction; a main digitizer disposed on the flat area of the display panel; a first sub-digitizer disposed on the main digitizer and partially overlapping with the main digitizer in a thickness direction; and a flexible printed circuit board electrically connecting the main digitizer with the first sub-digitizer.

In an embodiment of the present invention, the first sub-digitizer is configured to move in the first direction in accordance with a sliding behavior of the first sliding area.

In an embodiment of the present invention, if the first sub-digitizer moves in the first direction in accordance with the sliding behavior of the first sliding area, the first sub-digitizer is disposed on a lower surface of the first sliding area and partially overlaps with the first sliding area in the thickness direction.

In an embodiment of the present invention, the display device further includes: a plurality of segments attached to the lower surface of the first sliding area of the display panel, wherein the segments are extended in a second direction intersecting the first direction and are spaced apart from one another.

In an embodiment of the present invention, each of the plurality of segments includes a non-magnetic material.

In an embodiment of the present invention, the display device further includes: a support plate disposed between the flat area of the display panel and the main digitizer.

In an embodiment of the present invention, the support plate includes a metallic material, and wherein the display device further includes: a magnetic metal powder layer interposed between the support plate and the main digitizer.

In an embodiment of the present invention, the support plate includes a non-magnetic material, and wherein the main digitizer is attached directly to a lower surface of the support plate.

In an embodiment of the present invention, the display device further includes: a plurality of segments attached to a lower surface of the first sliding area of the display panel, wherein the segments are extended in a second direction intersecting the first direction and are spaced apart from one another, wherein a thickness of each of the plurality of segments is larger than a sum of a thickness of the support plate and a thickness of the main digitizer by a difference, and wherein an air gap is formed on a bottom surface of the main digitizer by the difference.

In an embodiment of the present invention, the main digitizer and the first sub-digitizer are spaced apart from each other with the air gap therebetween.

In an embodiment of the present invention, one end of the flexible printed circuit board is attached to a bottom surface of the main digitizer, and wherein an opposite end of the flexible printed circuit board is attached to a bottom surface of the first sub-digitizer.

In an embodiment of the present invention, the flexible printed circuit board covers a side surface of the first sub-digitizer.

In an embodiment of the present invention, each of the main digitizer and the first sub-digitizer has a width in the first direction, wherein the one end of the flexible printed circuit board is attached to a position on the bottom surface of the main digitizer that is a one-fourth position of the width of the main digitizer in the first direction with respect to one end of the main digitizer in the first direction, and wherein the opposite end of the flexible printed circuit board is attached at a position on the bottom surface of the first sub-digitizer that is a one-half position of the width of the first sub-digitizer in the first direction.

In an embodiment of the present invention, the display panel further includes a second sliding area adjacent to the flat area and configured to slide in a direction opposite to the first direction, wherein the flat area is disposed between the first sliding area and the second sliding area, wherein the display device further includes: a second sub-digitizer disposed on the main digitizer and spaced apart from the first sub-digitizer in the first direction, and wherein the second sub-digitizer is configured to move in the direction opposite to the first direction in accordance with a sliding behavior of the second sliding area.

According to an embodiment of the present invention, a display device includes: a display panel including a first area and a second area adjacent to the first area in a first direction and configured to slide in the first direction; a main digitizer disposed under the first area of the display panel; a sub-digitizer disposed under the main digitizer and partially overlapping with the main digitizer in a thickness direction; a first connector attached to a first surface of the main digitizer; and a second connector attached to a first surface of the sub-digitizer.

In an embodiment of the present invention, the sub-digitizer is configured to move in the first direction in accordance with a sliding behavior of the second area.

In an embodiment of the present invention, when the sub-digitizer moves in the first direction in accordance with the sliding behavior of the second area, the sub-digitizer is disposed on a first surface of the second area and partially overlaps with the second area, and wherein when the sub-digitizer moves in the first direction in accordance with the sliding behavior of the second area, the first connector and the second connector are in direct contact with each other so that the main digitizer and the sub-digitizer are electrically connected with each other.

In an embodiment of the present invention, the second connector is wider in the first direction than the first connector.

In an embodiment of the present invention, the display device further includes: a plurality of segments attached to the first surface of the second area of the display panel, wherein the segments are extended in a second direction intersecting the first direction and are spaced apart from one another.

In an embodiment of the present invention, each of the plurality of segments includes a non-magnetic material.

BRIEF DESCRIPTION OF THE DRAWINGS

The above and other features of the present invention will become more apparent by describing in detail embodiments thereof with reference to the attached drawings, in which:

FIG. 1 is a perspective view of a display device according to an embodiment of the present invention.

FIG. 2 is a perspective view showing the display device of FIG. 1 when it is expanded.

FIG. 3 is a perspective view showing an arrangement relationship between a display panel and a digitizer member of the display device according to the embodiment of FIG. 1.

FIG. 4 is a perspective view showing an arrangement relationship between the display panel and the digitizer member when the display device according to the embodiment of FIG. 1 is expanded.

FIG. 5 is a view showing an arrangement relationship between the display panel, the support module and the digitizer member of the display device according to the embodiment of FIG. 1.

FIG. 6 is a view for illustrating an electrical connection relationship between the main digitizer and the sub-digitizer when the display device according to the embodiment of FIG. 1 is expanded.

FIG. 7 is an exploded perspective view of the digitizer member of the display device according to the embodiment of FIG. 1.

FIG. 8 is a cross-sectional view schematically showing a cross section taken along line X1-X1' of FIG. 7.

FIG. 9 is a view showing an arrangement relationship between the display panel, the support module and the digitizer member of the display device according to an embodiment of the present invention.

FIG. 10 is a view for illustrating an electrical connection relationship between a main digitizer and sub-digitizers of a display device according to an embodiment of the present invention.

FIG. 11 is a view for illustrating an electrical connection relationship between the main digitizer and the sub-digitizer when the display device according to the embodiment of FIG. 10 is expanded.

FIG. 12 is a view for illustrating an electrical connection relationship between a main digitizer and sub-digitizers of a display device according to an embodiment of the present invention.

FIGS. 13 and 14 are views for illustrating an electrical connection relationship between the main digitizer and the sub-digitizer when the display device according to the embodiment of FIG. 12 is expanded.

DETAILED DESCRIPTION OF THE EMBODIMENTS

The present invention will now be described more fully hereinafter with reference to the accompanying drawings, in which preferred embodiments of the invention are shown. This invention may, however, be embodied in different forms and should not be construed as being limited to the embodiments set forth herein.

It will also be understood that when a layer is referred to as being "on" another layer or substrate, it can be directly on the other layer or substrate, or intervening layers may also be present. The same reference numbers may indicate the same components throughout the specification, and thus, repetitive descriptions may be omitted.

It will be understood that, although the terms "first," "second," etc. may be used herein to describe various elements, these elements should not be limited by these terms. These terms are only used to distinguish one element from another element. For instance, a first element discussed below could be termed a second element without departing from the spirit and scope of the present invention. Similarly, the second element could also be termed the first element.

Features of each of various embodiments of the present invention may be partially or entirely combined with each other and may technically variously interwork with each other, and respective embodiments may be implemented independently of each other or may be implemented together in association with each other.

Hereinafter, embodiments of the present invention will be described with reference to the accompanying drawings.

FIG. 1 is a perspective view of a display device 1 according to an embodiment of the present invention. FIG. 2 is a perspective view showing the display device 1 of FIG. 1 when it is expanded. FIG. 3 is a perspective view showing an arrangement relationship between a display panel PNL and a digitizer member 100 of the display device 1 according to the embodiment of FIG. 1. FIG. 4 is a perspective view showing an arrangement relationship between the display panel PNL and the digitizer member 100 when the display device 1 according to the embodiment of FIG. 1 is expanded. FIG. 5 is a view showing an arrangement relationship between a display panel PNL, a support module SM and a digitizer member 100 of a display device 1 according to the embodiment of FIG. 1. FIG. 6 is a view for illustrating an electrical connection relationship between the main digitizer 110 and the sub-digitizer when the display device 1 according to the embodiment of FIG. 1 is expanded.

Referring to FIGS. 1 and 2, a display device 1 according to an embodiment of the present invention may be a sliding display device or a slidable display device. The display device 1 may be, but is not limited to, a multi-slidable display device that slides in two directions. For example, the display device 1 may be a single slidable display device that slides only in one direction. In the following description, a multi-slidable display device will be described as the display device 1 according to the present embodiment.

In FIG. 1, a first direction DR1, a second direction DR2 and a third direction DR3 are illustrated. The first direction DR1 and the second direction DR2 are substantially perpendicular to each other. The first direction DR1 and the third direction DR3 are substantially perpendicular to each other, and the second direction DR2 and the third direction DR3 may be substantially perpendicular to each other. For example, the first direction DR1 may refer to the horizontal direction in the drawings, and the second direction DR2 may refer to the vertical direction in the drawings. The third direction DR3 may refer to the up-and-down direction (or, e.g., a thickness direction) in the drawings. For example, the first and second directions DR1 and DR2 may form a plane, and the third direction DR3 may be substantially perpendicular to the formed plane. As used herein, a direction may refer to the direction indicated by the arrow as well as the opposite direction, unless specifically stated otherwise. If it is necessary to discern between such two opposite directions, one of the two directions may be referred to as, for example, "a direction toward one side," while the other direction may be referred to as, for example, "a direction toward the opposite side." In FIG. 1, for example, the side indicated by the arrow of a direction may be referred to as one side in the direction, while the opposite side may be referred to as the opposite side in the direction.

In the following description of the surfaces of the display device 1 or the elements of the display device 1, the surfaces facing one side where images are displayed, i.e., the third direction DR3 will be referred to as the upper surface, while the opposite surfaces will be referred to as the lower surface for convenience of illustration. It should be understood, however, that the disclosure is not limited thereto. The surfaces and the opposite surface of the elements may be referred to as a front surface and a rear surface, respectively, or may be referred to as a first surface and a second surface, respectively. In addition, in the description of relative positions of the elements of the display device 1, one side in the second direction DR2 may be referred to as the upper side while the opposite side in the third direction DR3 may be referred to as the lower side.

The display device 1 may include a plane area PA and rounded areas RA. The plane area PA of the display device 1 overlaps with an open area of a panel storage where the display panel PNL is exposed, which will be described later. The rounded areas RA of the display device 1 may be formed inside the panel storage. The rounded areas RA may be curved with a predetermined radius of curvature, and the display panel PNL may be curved according to the radius of curvature. The round areas RA may be disposed on both sides of the plane area PA in the first direction DR1, respectively. For example, a first round area RA_1 may be disposed on the opposite side of the plane area PA in the first direction DR1 while a second round area RA_2 may be disposed on one side of the plane area PA in the first direction DR1. In the first rounded area RA_1, a second area PNL_2 of the display panel PNL, which will be described later, may be curved. In the second rounded area RA_2, a third area PNL_3 of the display panel PNL, which will be described later, may be curved. As shown in FIG. 2, the plane area PA may increase as the display device 1 expands. Accordingly, the distance between the first rounded area RA_1 and the second rounded area RA_2 may increase.

Referring to FIGS. 1 to 6, the display device 1 according to the present embodiment may include the display panel PNL, the support module SAME, the digitizer member 100, and the panel storage SD.

The display panel PNL displays images. Any kind of display panel may be employed as the display panel PNL according to the embodiment, such as an organic light-emitting display panel including an organic light-emitting layer, a micro light-emitting diode display panel using micro LEDs, a quantum-dot light-emitting display panel using quantum-dot light-emitting diodes including quantum-dot light-emitting layer, and an inorganic light-emitting display panel using inorganic light-emitting elements including an inorganic semiconductor.

The display panel PNL may be a flexible panel. The display panel PNL may have flexibility so that it can be partially rolled, bent or curved in the panel storage SD, as will be described later. The display panel PNL may slide in the first direction DR1.

The display panel PNL may include a first area PNL_1, a second area PNL_2, and a third area PNL_3. The first area PNL_1 may be supported by a support plate SP of the support module SM, and a second area PNL_2 and a third area PNL_3 may be supported by a plurality of segments SG, which will be described later. The first area PNL_1 may be disposed between the second area PNL_2 and the third area PNL_3. In other words, the second area PNL_2 may be located on the opposite side of the first area PNL_1 in the first direction DR1, and the third area PNL_3 may be located on one side of the first area PNL_1 in the first direction DR1.

The first area PNL_1 of the display panel PNL may be always flat and maintains a flat shape regardless of the sliding behavior of the display device 1.

Each of the second area PNL_2 and the third area PNL_3 of the display panel PNL may be either a bent area of the display panel PNL that is rolled, bent or curved, or a bendable area of the display panel PNL changing between a rolled, bent or curved shape and a flat shape according to the sliding behavior of the display device 1. For example, the second area PNL_2 of the display panel PNL may slide toward the opposite side in the first direction DR1, and the third area PNL_3 may slide toward one side in the first direction DR1. For example, the second area PNL_2 may slide in a direction opposite to which the third area PNL_3 slides. It will be understood that the second area PNL_2 of the display panel PNL may be referred to as a first sliding area, and the third area PNL_3 may be referred to as a second sliding area.

The display area DA of the display panel PNL may be divided into the first display area DA_1, the second display area DA_2 and the third display area DA_3 depending on whether the display panel PNL slides or not and on how long it slides if it does. The presence of the second display area DA_2 and the third display area DA_3 may depend on whether the display panel PNL slides or not, and the areas of them may vary depending on how long it slides. For example, when the display panel PNL does not slide, it has the first display area DA_1 having a first area. When the display panel PNL slides, the display area DA further includes the expanded second display area DA_2 and third display area DA_3 in addition to the first display area DA_1.

In the second display area DA_2, the second area PNL_2 of the display panel PNL and the plane area PA may overlap each other. In the third display area DA_3, the third area PNL_3 of the display panel PNL and the plane area PA may overlap each other. The areas of the second display area DA_2 and the third display area DA_3 may vary depending on how long the display device 1 slides in expansion. For example, as the second area PNL_2 of the display panel PNL is expanded toward the opposite side in the first direction DR1, the second display area DA_2 may become larger. As the third area PNL_3 of the display panel PNL is expanded toward one side in the first direction DR1, the third display area DA_3 may become larger.

When the display device 1 slides to the maximum toward the opposite side in the first direction DR1, the second display area DA_2 may have a second area. When the display device 1 slides to the maximum toward one side in the first direction DR1, the third display area DA_3 may have a third area. In this instance, the display area DA has a fourth area that is equal to the sum of the first area, the second area and the third area. The fourth area may be the maximum area that the display area DA can have.

The first display area DA_1 may overlap with the first area PNL_1 of the display panel PNL. The second display area DA_2 may overlap with at least a part of the second area PNL_2 of the display panel PNL. The third display area DA_3 may overlap with at least a part of the third area PNL_3 of the display panel PNL. In an embodiment of the present invention, the boundary between the first display area DA_1 and the second display area DA_2 may coincide with the boundary between the first area PNL_1 and the second area PNL_2, and the boundary between the first display area DA_1 and the third display area DA_3 may coincide with the boundary between the first area PNL_1 and the third area PNL_3. It should be understood, however, that the present invention is not limited thereto.

The display panel PNL may further include a subsidiary area SBA. The subsidiary area SBA may be disposed on one side of the first area PNL_1 of the display panel PNL in the second direction DR2. The subsidiary area SBA may be a folded, curved or bent. When the subsidiary area SBA is bent, the subsidiary area SBA may overlap the first area PNL_1 in the third direction DR3. In an embodiment of the present invention, the subsidiary area SBA may have, but is not limited to, a rectangular shape when viewed from the top.

The length of the subsidiary area SBA in the first direction DR1 may be substantially equal to the length of the first area PNL_1 in the first direction DR1. In addition, the length of the subsidiary area SBA in the first direction DR1 may be smaller than the length of the first area PNL_1 in the first direction DR1. In an embodiment of the present invention, the length of the subsidiary area SBA in the second direction DR2 may be smaller than the length of the first area PNL_1 in the second direction DR2. It should be understood, however, that the present invention is not limited thereto.

A driver circuit DC and a circuit board CB may be disposed on one surface of the subsidiary area SBA. The circuit board CB may be attached to the subsidiary area SBA using an anisotropic conductive film (ACF). The circuit board CB may be electrically connected to a pad area formed on the subsidiary area SBA. The circuit board CB may be, for example, a flexible printed circuit board (FPCB), a printed circuit board (PCB), or a flexible film such as a chip-on-film (COF). For example, the driver circuit DC may be implemented as an integrated circuit (IC) and may be attached to the subsidiary area SBA by a chip-on-glass (COG) technique, a chip-on-plastic (COP) technique, or ultrasonic bonding. In addition, the driver circuit DC may be mounted on the circuit board CB.

The support module SM may be attached to the bottom surface of the display panel PNL to support the display panel PNL and may assist in sliding behaviors of the display panel PNL in the first direction DR1. Referring to FIG. 5, the support module SM may include a support plate SP and a plurality of segments SG. The support plate SP may be disposed on the lower surface of the first area PNL_1 of the display panel PNL, and the plurality of segments SG disposed in the second area PNL_2 and the third area PNL_3 of the display panel PNL.

A support film may be interposed between the support module SM and the display panel PNL. The support film may include a polymer material having an elastic modulus to prevent stress generated from the support module SM from affecting the display panel PNL.

The support plate SP of the support module SM may support the first area PNL_1 of the display panel PNL. The support plate SP may be disposed on the bottom surface of the first area PNL_1 of the display panel PNL. The shape of the support plate SP may be substantially identical to the shape of the first area PNL_1 when viewed from the top. For example, the shape of the support plate SP may be, but is not limited to, a rectangle extended in the first direction DR1 and the second direction DR2 or a shape similar to a rectangle when viewed from the top. The support module SP may include a metal to ensure mechanical strength for supporting the first area PNL_1 of the display panel PNL. In an embodiment of the present invention, the support module SM may include, but is not limited to, a metal such as SUS304.

The plurality of segments SG of the support module SM may support the second area PNL_2 and the third area PNL_3 of the display panel PNL. The plurality of segments SG may be disposed on the bottom surface of the second area PNL_2 of the display panel PNL. Each of the plurality of segments SG may be extended in the second direction DR2 and may be spaced apart from one another in the first direction DR1. However, the present invention is not limited thereto, and for example, the plurality of segments SG may partially contact one another. The plurality of segments SG may include a non-magnetic material. This may be to increase the sensing sensitivity of the sub-digitizer, which will be described later. The non-magnetic material refers to a material that is not magnetized in a magnetic field. In an embodiment of the present invention, the plurality of segments SG may include, but is not limited to, plastic, an epoxy-based resin, carbon fiber reinforced plastics (CFRP) in which carbon fibers are surrounded with a resin, etc.

Referring to FIG. 5, one surface of each of the plurality of segments SG in the third direction DR3 may be the upper surface attached to the support film, and the opposite surface of the upper surface in the third direction DR3 may be the lower surface opposite to the upper surface. In addition, one surface of each of the plurality of segments SG in the first direction DR1 may be a first surface connecting the upper surface with the lower surface to each other, and the opposite surface of the first surface in the first direction DR1 may be a second surface connecting the upper surface with the lower surface. In an embodiment of the present invention, the shape of the plurality of segments SG viewed from the second direction DR2 may have a shape having the width in the first direction DR1 decreasing toward the opposite side in the third direction DR3 as shown in FIG. 5. For example, each of the plurality of segments SG may have a tapered shape. It should be understood, however, that the present invention is not limited thereto. In other words, the width of the upper surface of each of the plurality of segments SG in the first direction DR1 may be greater than the width of the lower surface in the first direction DR1, and the first side surface and the second surface may be inclined toward the inside of the segments SG. It should be understood, however, that the present invention is not limited thereto.

The digitizer member 100 may sense an electronic pen PEN. The digitizer member 100 may be disposed under the support module SM. The structure of the digitizer member 100 will be described later in conjunction with FIGS. 7 and 8. The digitizer member 100 may include a main digitizer 110, a first sub-digitizer 130, and a second sub-digitizer 150. When the display device 1 is not extended, the first sub-digitizer 130 may be located under the main digitizer 110 near the opposite side in the first direction DR1, the second sub-digitizer 150 may be located under the main digitizer 110 near the one side in the first direction DR1, and the first sub-digitizer 130 and the second sub-digitizer 150 may be spaced apart from each other in the first direction DR1.

The main digitizer 110 of the digitizer member 100 may be disposed under the support plate SP of the support module SM. The main digitizer 110 may sense the electronic pen PEN in the first area PNL_1 of the display panel PNL. The main digitizer 110 may have substantially the same shape as the support plate SP when viewed from the top. For example, the shape of the support plate SP may be, but is not limited to, a rectangle extended in the first direction DR1 and the second direction DR2 or a shape similar to a rectangle when viewed from the top. For example, the shape of the support plate SP may be some other polygonal shape.

As described above, the support plate SP may occupy substantially the same area as the first area PNL_1 of the display panel PNL, and thus the main digitizer 110 may also occupy substantially the same area as the first area PNL_1 of the display panel PNL. Accordingly, in an embodiment of the present invention, the opposite end of the support plate SP in the first direction DR1 and the opposite end 110b of the main digitizer 110 in the first direction DR1 may be aligned with the opposite end of the first area PNL_1 of the display panel PNL in the first direction DR1. One end of the support plate SP in the first direction DR1 and one end 110c of the main digitizer 110 in the first direction DR1 may be aligned with one end of the first area PNL_1 of the display panel PNL in the first direction DR1. It should be understood, however, that the present invention is not limited thereto. In the following description, it is assumed that the opposite end of the support plate SP in the first direction DR1 and the opposite end 110b of the main digitizer 110 in the first direction DR1 may be aligned with the opposite end of the first area PNL_1 of the display panel PNL in the first direction DR1. One end of the support plate SP in the first direction DR1 and one end 110c of the main digitizer 110 in the first direction DR1 may be aligned with one end of the first area PNL_1 of the display panel PNL in the first direction DR1, for convenience of illustration. In this instance, a central portion 110a of the main digitizer 110 located at the center of the main digitizer 110 between the opposite end 110b and the one end 110c of the main digitizer 110 may be aligned with the center of the first area PNL_1 of the display panel PNL.

A magnetic metal powder layer MMP may be interposed between the main digitizer 110 and the support plate SP. The magnetic metal powder layer MMP may absorb electromagnetic interference (EMI) or various noises that may deteriorate the sensing sensitivity of the electronic pen PEN by the main digitizer 110. Accordingly, even though the support plate SP includes a metal material and has magnetism, it is possible to prevent the sensing sensitivity of the electronic pen PEN by the main digitizer 110 from deteriorating. The main digitizer 110 may be electrically turned on when the display device 1 is not expanded as well as when it is expanded.

The first sub-digitizer 130 of the digitizer member 100 may sense an electronic pen PEN in the second area PNL_2 of the display panel PNL. In an embodiment of the present invention, the width of the first sub-digitizer 130 in the first direction DR1 may be smaller than the width of the main digitizer 110 in the first direction DR1. It should be understood, however, that the present invention is not limited thereto. For example, the width of the first sub-digitizer 130 in the first direction DR1 may be substantially equal to the width of the main digitizer 110 in the first direction DR1.

The first sub-digitizer 130 may be disposed under the main digitizer 110 and may partially overlap the main digitizer 110 in the third direction DR3 when the display device 1 is not expanded, and may move toward the opposite side in the first direction DR1 and may partially overlap the second area PNL_2 of the display panel PNL in the third direction DR3 when the display device 1 is expanded, as shown in FIGS. 3 and 4. In other words, when the display device 1 is not extended, the area in which the first sub-digitizer 130 overlaps with the main digitizer 110 in the third direction DR3 may be greater than the area in which the first sub-digitizer 130 overlaps with the second area PNL_2 of the display panel PNL in the third direction DR3. When the display device 1 is expanded, the area in which the first sub-digitizer 130 overlaps with the main digitizer 110 in the third direction DR3 may be less than the area in which the first sub-digitizer 130 overlaps with the second area PNL_2 of the display panel PNL in the third direction DR3.

In other words, the first sub-digitizer 130 may partially overlap with the main digitizer 110 in the third direction DR3 when the display device 1 is not expanded, and when the display device 1 is expanded, it may move toward the opposite side in the first direction DR1 in accordance with the sliding behavior of the second area PNL_2 of the display panel PNL toward the opposite side in the first direction DR1. For example, the first sub-digitizer 130 may move toward the opposite side in the first direction DR1 as the second area PNL_2 of the display panel PNL is expanded so that it overlaps with the second display area DA_2 in the third direction DR3 that displays images as a part of the second area PNL_2. In accordance with the sliding behavior of the display device 1, the first sub-digitizer 130 may partially overlap with the first display area DA_1 or the first area PNL_1 of the display panel PNL in the third direction DR3.

In an embodiment of the present invention, when the display device 1 is not expanded, one end 130c of the first sub-digitizer 130 in the first direction DR1 may be located near the central portion 110a of the main digitizer 110 in the first direction DR1, as shown in FIG. 5. When the display device 1 is expanded, one end 130c of the first sub-digitizer 130 in the first direction DR1 may be located near the opposite end 110b of the main digitizer 110 in the first direction DR1 and may overlap with the second area PNL_2 of the display panel PNL and the plurality of segments SG in the third direction DR3, as shown in FIG. 6. As described above, since the plurality of segments SG includes a non-magnetic material, the first sub-digitizer 130 may facilitate sensing of the electronic pen PEN on the second area PNL_2 of the display panel PNL.

In an embodiment of the present invention, one end of the flexible printed circuit board 300 may be attached to a position on the bottom surface of the main digitizer 110 that may be one-fourth position 110*d* of the width of the main digitizer 110 in the first direction DR1 from the opposite end 110*b* to the one side 110*c* of the main digitizer 110 in the first direction DR1, as shown in FIG. 5. In other words, the end of the flexible printed circuit board 300 may be attached to the position on the bottom surface of the main digitizer 110 that may be the center between the opposite end 110*b* of the main digitizer 110 in the first direction DR1 and the central portion 110*a* of the main digitizer 110 in the first direction DR1.

The second sub-digitizer 150 of the digitizer member 100 may sense an electronic pen PEN in the third area PNL_3 of the display panel PNL. In an embodiment of the present invention, the width of the second sub-digitizer 150 in the first direction DR1 may be smaller than the width of the main digitizer 110 in the first direction DR1. It should be understood, however, that the present invention is not limited thereto. For example, the width of the second sub-digitizer 150 in the first direction DR1 may be substantially equal to the width of the main digitizer 110 in the first direction DR1.

The second sub-digitizer 150 may be disposed under the main digitizer 110 and may partially overlap the main digitizer 110 in the third direction DR3 when the display device 1 is not expanded, and may move toward the one side in the first direction DR1 and may partially overlap the third area PNL_3 of the display panel PNL in the third direction DR3 when the display device 1 is expanded, as shown in FIGS. 3 and 4. In other words, when the display device 1 is not extended, the area in which the second sub-digitizer 150 overlaps with the main digitizer 110 in the third direction DR3 may be greater than the area in which the second sub-digitizer 150 overlaps with the third area PNL_3 of the display panel PNL in the third direction DR3. When the display device 1 is expanded, the area in which the second sub-digitizer 150 overlaps with the main digitizer 110 in the third direction DR3 may be less than the area in which the second sub-digitizer 150 overlaps with the third area PNL_3 of the display panel PNL in the third direction DR3.

In other words, the second sub-digitizer 150 may partially overlap with the main digitizer 110 in the third direction DR3 when the display device 1 is not expanded, and when the display device 1 is expanded, it may move toward the one side in the first direction DR1 in accordance with the sliding behavior of the third area PNL_3 of the display panel PNL toward the one side in the first direction DR1. For example, the second sub-digitizer 150 may move to the one side in the first direction DR1 as the second area PNL_3 of the display panel PNL is expanded so that it completely overlaps with the third display area DA_3 that displays images as a part of the third area PNL_3. In accordance with the sliding behavior of the display device 1, the second sub-digitizer 150 may partially overlap with the first display area DA_1 and/or the first area PNL_1 of the display panel PNL in the third direction DR3.

In an embodiment of the present invention, when the display device 1 is not expanded, the opposite end 150*b* of the second sub-digitizer 150 in the first direction DR1 may be located near the central portion 110*a* of the main digitizer 110 in the first direction DR1, as shown in FIG. 5. When the display device 1 is expanded, the opposite end 150*b* of the second sub-digitizer 130 in the first direction DR1 may be located near the one end 110*c* of the main digitizer 110 in the first direction DR1 and may overlap with the third area PNL_3 of the display panel PNL and the plurality of segments SG in the third direction DR3, similarly to the movement of the first sub-digitizer 130. As described above, since the plurality of segments SG includes a non-magnetic material, the second sub-digitizer 150 may facilitate sensing of the electronic pen PEN on the third area PNL_3 of the display panel PNL.

The flexible printed circuit board 300 may include a first flexible printed circuit board and a second flexible printed circuit board. The first flexible printed circuit board electrically connects the main digitizer 110 with the first sub-digitizer 130, and the second flexible printed circuit board electrically connects the main digitizer 110 with the second sub-digitizer 150.

The first flexible printed circuit board 310 of the flexible printed circuit board 300 electrically connects the first sub-digitizer 130 with the main digitizer 110 so that when the display device 1 is expanded, the first sub-digitizer 130 may be electrically turned on. The first sub-digitizer 130 may be electrically turned off when the display device 1 is not expanded.

The driving of the first sub-digitizer 130 by the first flexible printed circuit board 310 may be continuously performed according to the expansion of the display device 1. In other words, as the display device 1 expands, the driving area of the first sub-digitizer 130 may gradually increase. For example, a separate sensor that senses the second display area DA_2 of the second area PNL_2 of the display panel PNL when the display device 1 is expanded may be disposed inside the display device 1. The first sub-digitizer 130 may be electrically turned on to drive one area of the first sub-digitizer 130 that is equal to the area corresponding to the second display area DA_2.

One end of the first flexible printed circuit board 310 may be attached to the main digitizer 110, while the other end of the first flexible printed circuit board 310 may be attached to the first sub-digitizer 130. For example, the one end of the first flexible printed circuit board 310 may be attached to the bottom surface of main digitizer 110, while the other end of the first flexible printed circuit board 310 may be attached to the bottom surface of the first sub-digitizer 130. Accordingly, when the display device 1 is not expanded, the first flexible printed circuit board 310 may surround one side surface of the first sub-digitizer 130 in the first direction DR1 as shown in FIG. 5.

In an embodiment of the present invention, the one end of the first flexible printed circuit board 310 and the bottom surface of the main digitizer 110 may be attached to each other by, but is not limited to, an anisotropic conductive film (ACF), and the other end of the first flexible printed circuit board 310 and the bottom surface of the first sub-digitizer 130 may be attached to each other by, but is not limited to, an anisotropic conductive film (ACF).

In an embodiment of the present invention, one end of the first flexible printed circuit board 310 may be attached to a position on the bottom surface of the main digitizer 110 that may be one-fourth position 110*d* of the width of the main digitizer 110 in the first direction DR1 from the opposite end 110*b* to the one end 110*c* of the main digitizer 110 in the first direction DR1, as shown in FIG. 5. In other words, the one end of the first flexible printed circuit board 310 may be attached to the position on the bottom surface of the main digitizer 110 that may be the center between the opposite end 110*b* of the main digitizer 110 in the first direction DR1 and the central portion 110a of the main digitizer 110 in the first direction DR1. With the above-described configuration, the moving path of the first sub-digitizer 130 toward the opposite side in the first direction DR1 can be obtained while reducing the length of the first flexible printed circuit board 310, so that the inside of the display device 1 can be simplified.

In an embodiment of the present invention, the other end of the first flexible printed circuit board 310 may be attached to a position on the bottom surface of the first sub-digitizer 130 that may be a one-half position 130a (or, e.g., a central position) of the width of the first sub-digitizer 130 in the first direction DR1, as shown in FIG. 5.

The second flexible printed circuit board 330 of the flexible printed circuit board 300 electrically connects the second sub-digitizer 150 with the main digitizer 110 so that when the display device 1 is expanded, the second sub-digitizer 150 may be electrically turned on. The second sub-digitizer 150 may be electrically turned off when the display device 1 is not expanded.

The driving of the second sub-digitizer 150 by the second flexible printed circuit board 330 may be continuously performed according to the expansion of the display device 1. In other words, as the display device 1 expands, the driving area of the second sub-digitizer 150 may gradually increase. For example, a separate sensor that senses the third display area DA_3 of the third area PNL_3 of the display panel PNL when the display device 1 is expanded may be disposed inside the display device 1. The second sub-digitizer 150 may be electrically turned on to drive one area of the second sub-digitizer 150 that is equal to the area corresponding to the third display area DA_3.

The one end of the second flexible printed circuit board 330 may be attached to the main digitizer 110, while the other end of the second flexible printed circuit board 330 may be attached to the second sub-digitizer 150. For example, the one end of the second flexible printed circuit board 330 may be attached to the bottom surface of the main digitizer 110, while the other end of the second flexible printed circuit board 330 may be attached to the bottom surface of the second sub-digitizer 150. Accordingly, when the display device 1 is not expanded, the second flexible printed circuit board 330 may surround the opposite side surface of the second sub-digitizer 150 in the first direction DR1 as shown in FIG. 5.

In an embodiment of the present invention, one end of the second flexible printed circuit board 330 and the bottom surface of the main digitizer 110 may be attached to each other by, but is not limited to, an anisotropic conductive film (ACF), and the other end of the second flexible printed circuit board 330 and the bottom surface of the second sub-digitizer 150 may be attached to each other by, but is not limited to, an anisotropic conductive film (ACF).

In an embodiment of the present invention, one end of the second flexible printed circuit board 330 may be attached to a position on the bottom surface of the main digitizer 110 that may be one-fourth position 110e of the width of the main digitizer 110 in the first direction DR1 from the one end 110c to the opposite end 110b of the main digitizer 110 in the first direction DR1, as shown in FIG. 5. In other words, the one end of the second flexible printed circuit board 330 may be attached to the position on the bottom surface of the main digitizer 110 that may be the center between the one end 110c of the main digitizer 110 in the first direction DR1 and the central portion 110a of the main digitizer 110 in the first direction DR1. With the above-described configuration, the moving path of the second sub-digitizer 150 toward the one side in the first direction DR1 can be obtained while reducing the length of the second flexible printed circuit board 330, so that the inside of the display device 2 can be simplified.

In an embodiment of the present invention, the other end of the second flexible printed circuit board 330 may be attached to a position on the bottom surface of the second sub-digitizer 150 that may be a one-half position 150a (or, e.g., a central position) of the width of the second sub-digitizer 150 in the first direction DR1, as shown in FIG. 5.

The sum of the width of the support plate SP in the third direction DR3 (hereinafter referred to as thickness), the width of the magnetic metal powder layer in the third direction DR3 (hereinafter referred to as thickness) and the width of the main digitizer 110 in the third direction DR3 (hereinafter referred to as thickness) may be less than the width of each of the segments SG in the third direction DR3 (hereinafter referred to as thickness). Accordingly, an air gap may be formed on the bottom surface of the main digitizer 110, which is equal to the difference between the sum of the thickness of the support plate SP, the thickness of the magnetic metal powder layer MMP and the thickness of the main digitizer 110 and the thickness of each of the plurality of segments SG. As the air gap is formed under the main digitizer 110, a shock applied to the display panel PNL can be mitigated. For example, the air gap may absorb a shock when an object such as a user's electronic pen PEN drops onto the first area PNL_1 of the display panel PNL.

As shown in FIGS. 1 and 2, the panel storage SD accommodates and/or houses at least a part of the display panel PNL and the support module SM, and may assist the sliding behavior of the display device 1. The panel storage SD may include a first storage SD_1, a second storage SD_2, and a third storage SD_3. The first storage SD_1 may be located at the center of the display device 1. The second storage SD_2 may be disposed on the opposite side of the first storage SD_1 in the first direction DR1 and may comprise the first rounded area RA_1. The third storage SD_3 may be disposed on one side of the first storage SD_1 in the first direction DR1 and may comprise the second rounded area RA_2.

The first storage SD_1 may connect the second storage SD_2 with the third storage SD_3. For example, the first storage SD_1 may include a (1_1) storage SD_1a and a (1_2) storage SD_1b. The (1_1) storage SD_1a may connect one side of the second storage SD_2 in the second direction DR2 with one side of the third storage SD_3 in the second direction DR2. The (1_2) storage SD_1b may connect the opposite side of the second storage SD_2 in the second direction DR2 with the opposite side of the third storage SD_3 in the second direction DR2.

In an embodiment of the present invention, rails may be formed inside the second storage SD_2 and the third storage SD_3 to guide the sliding behaviors of the display panel PNL. It should be understood, however, that the present invention is not limited thereto.

Hereinafter, the structure of the digitizer member 100 will be described.

FIG. 7 is an exploded perspective view of the digitizer member 100 of the display device 1 according to the embodiment of FIG. 1. FIG. 8 is a cross-sectional view schematically showing a cross section taken along line X1-X1' of FIG. 7. FIGS. 7 and 8 show an example of the structure of the main digitizer 110. The structure of the main digitizer 110 is substantially identical to the structure of the first sub-digitizer 130 and the structure of the second sub-digitizer 150. Therefore, the structure of the main digitizer 110 will be described as an example while the first sub-digitizer 130 and the second sub-digitizer 150 will not be described.

Referring to FIGS. 7 and 8, the main digitizer 110 of the display device 1 according to the present embodiment may include a base layer BSL, first electrode patterns EP1, second electrode patterns EP2, first dummy patterns DP1, second dummy patterns DP2, a first adhesive layer ADL1, a second adhesive layer ADL2, a first cover layer CVL1, and a second cover layer CVL2.

The base layer BSL may be the base of the main digitizer 110 and may insulate first electrode patterns EP1 from second electrode patterns EP2, which will be described later. The base layer BSL may have flexibility and may include an insulating material. In an embodiment of the present invention, the base layer BSL may include, but is not limited to, polyimide.

The first electrode patterns EP1 and first dummy patterns DP1 may be disposed on the upper surface of the base layer BSL. The second electrode patterns EP2 and second dummy patterns DP2 may be disposed on the lower surface of the base layer BSL.

Each of the first electrode patterns EP1 may be extended in the horizontal direction to have a shape of a loop structure when viewed from the top. The first electrode patterns EP1 may be spaced apart from one another and disposed side by side in the vertical direction. For example, since each of the first electrode patterns EP1 has a loop structure, if there is no element inside the loop, the region where the first electrode pattern EP1 is disposed, i.e., the border of the loop may be elevated whereas the inside of the first electrode pattern EP1 may be depressed. To avoid such elevations/depressions, at least one first dummy pattern DP1 may be disposed inside the loop formed by each of the first electrode patterns EP1. In other words, the first dummy patterns DP1 may be surrounded by the first electrode patterns EP1.

In an embodiment of the present invention, the first dummy patterns DP1 may be extended in the horizontal direction and may be substantially equally spaced apart from one another in the vertical direction. It should be understood, however, that the present invention is not limited thereto. For example, the first dummy patterns DP1 may be extended in the vertical direction and may be spaced apart from one another in the horizontal direction.

Each of the second electrode patterns EP2 may be extended in the vertical direction to have a shape of a loop structure when viewed from the top. The second electrode patterns EP2 may be spaced apart from one another and disposed side by side in the horizontal direction. For example, since each of the second electrode patterns EP2 has a loop structure, if there is no element inside the loop, the region where the second electrode pattern EP2 is disposed, i.e., the border of the loop may be elevated whereas the inside of the second electrode pattern EP2 may be depressed. To avoid such elevations/depressions, at least one second dummy pattern DP2 may be disposed inside the loop formed by each of the second electrode patterns EP2. In other words, the second dummy patterns DP2 may be surrounded by the second electrode patterns EP2.

In an embodiment of the present invention, each of the second dummy patterns DP2 may be extended in the vertical direction and may be substantially equally spaced apart from one another in the horizontal direction. It should be understood, however, that the present invention is not limited thereto. For example, the second dummy patterns DP2 may be extended in the horizontal direction and may be spaced apart from one another in the vertical direction.

In an embodiment of the present invention, each of the first electrode patterns EP1 and each of the second electrode patterns EP2 may have a rectangular loop structure when viewed from the top, but the present invention is not limited thereto. For example, each of the first electrode patterns EP1 and the second electrode patterns EP2 may have various types of loop structures such as a diamond loop structure and a hexagonal loop structure when viewed from the top.

Each of the first electrode patterns EP1, the first dummy patterns DP1, the second electrode patterns EP2 and the second dummy patterns DP2 may include a metal material. In an embodiment of the present invention, each of the first electrode patterns EP1, the first dummy patterns DP1, the second electrode patterns EP2 and the second dummy patterns DP2 may include, but is not limited to, copper (Cu) and silver (Ag), nickel (Ni), tungsten (W), etc.

When the main digitizer 110 is viewed in the thickness direction, the first electrode patterns EP1 and the second electrode patterns EP2 may cross each other. Accordingly, the magnetic field or electromagnetic signal emitted from the electronic pen PEN can be absorbed by the first electrode patterns EP1 and the second electrode patterns EP2, and thus, it is possible to determine to which position of the digitizer layer the electronic pen PEN is proximate.

In addition, the first electrode patterns EP1 and the second electrode patterns EP2 may generate magnetic field upon receiving an input current, and the generated magnetic field or electromagnetic signal may be absorbed by the electronic pen PEN, and the electronic pen PEN may emit the absorbed magnetic field again. The magnetic field emitted by the electronic pen PEN may be absorbed by the first electrode patterns EP1 and the second electrode patterns EP2. The first electrode patterns EP1 and the second electrode patterns EP2 may convert the magnetic field or the electromagnetic signal output from the electronic pen into electric signal.

The first cover layer CVL1 can protect the main digitizer 110 from the outside. The first cover layer CVL1 may be disposed over the first electrode patterns EP1 and the first dummy patterns DP1 that are disposed on the upper surface of the base layer BSL. The first adhesive layer ADL1 may be interposed between the first cover layer CVL1 and the upper surface of the base layer BSL on which the first electrode patterns EP1 and the first dummy patterns DP1 are disposed, so that the first cover layer CVL1 may be attached to the upper surface of the base layer BSL. The first cover layer CVL1 may have flexibility and may include an insulating material. In an embodiment of the present invention, the first cover layer CVL1 may include, but is not limited to, polyimide.

The second cover layer CVL2 can protect the main digitizer 110 from the outside. The second cover layer CVL2 may be disposed on the second electrode patterns EP2 and the second dummy patterns DP2 that are disposed on the lower surface of the base layer BSL. The second adhesive layer ADL2 may be interposed between the second cover layer CVL2 and the lower surface of the base layer BSL, on which the second electrode patterns EP2 and the second dummy patterns DP2 are disposed, so that the second cover layer CVL2 may be attached to the lower surface of the base layer BSL. The second cover layer CVL2 may have flexibility and may include an insulating material. In an embodiment of the present invention, the second cover layer CVL2 may include, but is not limited to, polyimide.

Hereinafter, a display device 1 according to other embodiments of the present invention will be described. In the following description, elements that are the same or similar to elements previously described will be denoted by the same or similar reference numerals, and redundant descriptions will be omitted or briefly described.

FIG. 9 is a view showing an arrangement relationship between a display panel PNL, a support module SM1 and a digitizer member 100 of a display device according to an embodiment of the present invention.

FIG. 9 shows an example where a support plate SP1 of a display device 1_1 according to this embodiment may include a non-magnetic material. In an embodiment of the present invention, the support plate SP1 may include, but is not limited to, plastic, an epoxy-based resin, carbon fiber reinforced plastics (CFRP) in which carbon fibers are surrounded with a resin, etc.

As described above, since such a non-magnetic material is not magnetized inside a magnetic field, it is possible to eliminate a separate element that serves to absorb electromagnetic interference (EMI) or noise such as the magnetic metal powder layer MMP of the display device 1 according to the above-described embodiment. In other words, the main digitizer 110 may be attached directly to the lower surface of the support plate SP1. Accordingly, the width of the air gap formed on the bottom surface of the main digitizer 110 in the third direction DR3 becomes relatively thick, so that the mechanical stability can be further increased.

FIG. 10 is a view for illustrating an electrical connection relationship between a main digitizer and sub-digitizers of a display device according to an embodiment of the present invention. FIG. 11 is a view for illustrating an electrical connection relationship between the main digitizer and the sub-digitizer when the display device according to the embodiment of FIG. 10 is expanded.

FIGS. 10 and 11 show an example where a main digitizer 110 and sub-digitizers 130 and 150 of a display device 1_2 may be electrically connected by physical contact with a plurality of connectors 502. For example, when the display device 1_2 is not expanded, the plurality of connectors 502 may be spaced apart from one another so that a main digitizer 110 and sub-digitizers 130 and 150 are not electrically connected with one another as shown in FIG. 10. In addition, when the display device 1_2 is expanded, the connectors 502 may come into contact with one another to electrically connect the main digitizer 110 with the sub-digitizers 130 and 150 as shown in FIG. 11.

The connectors 502 may be components for performing electrical connection, and may perform electrical connection by physical contact. The connectors 502 may include a main connector 512, a third connector 532, and a fourth connector 552. The main connector 512 may be disposed on the main digitizer 110. The third connector 532 may be disposed on the first sub-digitizer 130, and the fourth connector 552 may be disposed on the second sub-digitizer 150.

The main connector 512 may include a first connector 512a and a second connector 512b. The first connector 512a and the second connector 512b may be attached to the bottom surface of the main digitizer 110. For example, the first connector 512a may be disposed at the opposite end in the first direction DR1 on the bottom surface of the main digitizer 110, and the second connector 512b may be disposed at one end in the first direction DR1 on the bottom surface of the main digitizer 110. The first connector 512a and the second connector 512b may have a predetermined width in the third direction DR3 (hereinafter referred to as thickness). Accordingly, the first connector 512a and the second connector 512b may have a shape protruding toward the opposite side in the third direction DR3 from the bottom surface of the main digitizer 110.

The third connector 532 may be attached to the top surface of the first sub-digitizer 130. For example, the third connector 532 may be disposed at one end in the first direction DR1 on the top surface of the first sub-digitizer 130, and may have a predetermined width in the third direction DR3 (hereinafter referred to as thickness). Accordingly, the third connector 532 may have a shape protruding in the third direction DR3 from the top surface of the first sub-digitizer 130. For example, the first connector 512a may have the same shape and may be substantially the same size as that of the third connector 532; however, the present invention is not limited thereto.

The fourth connector 552 may be attached to the top surface of the second sub-digitizer 150. For example, the fourth connector 552 may be disposed at the opposite end in the first direction DR1 on the top surface of the first sub-digitizer 150, and may have a predetermined width in the third direction DR3 (hereinafter referred to as thickness). Accordingly, the fourth connector 552 may have a shape protruding in the third direction DR3 from the top surface of the second sub-digitizer 150. For example, the second connector 512b may have the same shape and may be substantially the same size as that of the fourth connector 552; however, the present invention is not limited thereto.

When the display device 1_2 according to this embodiment is expanded, the third connector 532 may also move toward the opposite side in the first direction DR1 along with the movement of the first sub-digitizer 130 toward the opposite side in the first direction DR1, and may be in contact with the first connector 512a disposed on the opposite side (or, e.g., end) of the main digitizer 110 in the first direction DR1, so that the first sub-digitizer 130 and the main digitizer 110 can be electrically connected with each other, as shown in FIG. 11. Accordingly, the first sub-digitizer 130 may be electrically turned on. Likewise, when the display device 1_2 according to this embodiment is expanded, the fourth connector 552 may also move toward one side in the first direction DR1 along with the movement of the second sub-digitizer 150 toward one side in the first direction DR1, and may be in contact with the second connector 512b disposed on one side (or, e.g., end) of the main digitizer 110 in the first direction DR1, so that the second sub-digitizer 150 and the main digitizer 110 can be electrically connected with each other. Accordingly, the second sub-digitizer 150 may be electrically turned on.

In an embodiment of the present invention, the sum of the thickness of the first connector 512a and the thickness of the third connector 532 may be substantially equal to the distance between the main digitizer 110 and the first sub-digitizer 130 in the third direction DR3. The sum of the thickness of the second connector 512b and the thickness of the fourth connector 552 may be substantially equal to the distance between the main digitizer 110 and the second sub-digitizer 150 in the third direction DR3. Accordingly, it is possible to reduce friction that may occur when the first connector 512a and the third connector 532 physically come into contact with each other when the display device 1_2 is expanded, and it is possible to reduce friction that may occur when the second connector 512b and the fourth connector 552 physically come into contact with each other when the display device 1_2 is expanded.

FIG. 12 is a view for illustrating an electrical connection relationship between a main digitizer and sub-digitizers of a display device according to an embodiment of the present invention. FIGS. 13 and 14 are views for illustrating an electrical connection relationship between the main digitizer and the sub-digitizer when the display device according to the embodiment of FIG. 14 is expanded.

A display device 1_3 according to the embodiment of FIGS. 12 to 14 is substantially identical to the display device 1 according to the embodiment of FIG. 10 except that a third connector 533 and a fourth connector 553 among a plurality of connectors 503 are extended in the first direction DR1. Therefore, the third connector 533 and the fourth connector 553 will be mainly described, and the other elements might not be described.

The third connector 533 may have a shape extended from one end of the first sub-digitizer 130 to the opposite side in the first direction DR1. For example, the width of the third connector 533 in the first direction DR1 may be larger than that of the first connector 512a. Accordingly, when the display device 1_3 is expanded, a first connector 512a and a third connector 533 come in contact with each other continuously, so that an electronic pen PEN can be continuously sensed. For example, as shown in FIG. 13, the third connector 533 and the first connector 512a can be electrically connected with each other even when the display device 1_3 is not fully expanded so that the first sub-digitizer 130 can be electrically turned on. As shown in FIG. 14, the third connector 533 and the first connector 512a can be electrically connected with each other when the display device 1_3 is fully expanded so that the first sub-digitizer 130 can be electrically turned on.

The fourth connector 553 may have a shape extended from the opposite end of the second sub-digitizer 150 to one side in the first direction DR1. For example, the width of the fourth connector 553 in the first direction DR1 may be larger than that of the second connector 512b. Accordingly, when the display device 1_3 is expanded, a second connector 512b and the fourth connector 553 come in contact with each other continuously, so that an electronic pen PEN can be continuously sensed. For example, similar to the relationship between the third connector 533 and first connector 512a, the fourth connector 553 and the second connector 512b can be electrically connected with each other even when the display device 1_3 is not fully expanded so that the second sub-digitizer 150 can be electrically turned on. When the display device 1_3 is fully expanded, the fourth connector 553 and the second connector 512b can be electrically connected with each other so that the second sub-digitizer 150 can be electrically turned on.

While the present invention has been described with reference to the embodiments thereof, it will be understood by those of ordinary skill in the art that various changes in form and detail may be made thereto without departing from the spirit and scope of the present invention.

What is claimed is:

1. A display device comprising:
a display panel comprising a flat area and a first sliding area adjacent to the flat area in a first direction and configured to slide in the first direction;
a main digitizer disposed on the flat area of the display panel;
a first sub-digitizer disposed on the main digitizer and partially overlapping with the main digitizer in a thickness direction; and
a flexible printed circuit board electrically connecting the main digitizer with the first sub-digitizer,
wherein when the display panel slides in the first direction, the first sub-digitizer moves away from a central portion of the main digitizer.

2. The display device of claim 1, wherein the first sub-digitizer is configured to move in the first direction in accordance with a sliding behavior of the first sliding area.

3. The display device of claim 2, wherein if the first sub-digitizer moves in the first direction in accordance with the sliding behavior of the first sliding area, the first sub-digitizer is disposed on a lower surface of the first sliding area and partially overlaps with the first sliding area in the thickness direction.

4. The display device of claim 3, further comprising:
a plurality of segments attached to the lower surface of the first sliding area of the display panel, wherein the segments are extended in a second direction intersecting the first direction and are spaced apart from one another.

5. The display device of claim 4, wherein each of the plurality of segments comprises a non-magnetic material.

6. The display device of claim 2, further comprising:
a support plate disposed between the flat area of the display panel and the main digitizer.

7. The display device of claim 6, wherein the support plate comprises a metallic material, and
wherein the display device further comprises:
a magnetic metal powder layer interposed between the support plate and the main digitizer.

8. The display device of claim 6, wherein the support plate comprises a non-magnetic material, and wherein the main digitizer is attached directly to a lower surface of the support plate.

9. The display device of claim 6, further comprising:
a plurality of segments attached to a lower surface of the first sliding area of the display panel, wherein the segments are extended in a second direction intersecting the first direction and are spaced apart from one another,
wherein a thickness of each of the plurality of segments is larger than a sum of a thickness of the support plate and a thickness of the main digitizer by a difference, and
wherein an air gap is formed on a bottom surface of the main digitizer by the difference.

10. The display device of claim 9, wherein the main digitizer and the first sub-digitizer are spaced apart from each other with the air gap therebetween.

11. The display device of claim 2, wherein one end of the flexible printed circuit board is attached to a bottom surface of the main digitizer, and
wherein an opposite end of the flexible printed circuit board is attached to a bottom surface of the first sub-digitizer.

12. The display device of claim 11, wherein the flexible printed circuit board covers a side surface of the first sub-digitizer.

13. The display device of claim 12, wherein each of the main digitizer and the first sub-digitizer has a width in the first direction,
wherein the one end of the flexible printed circuit board is attached to a position on the bottom surface of the main digitizer that is a one-fourth position of the width of the main digitizer in the first direction with respect to one end of the main digitizer in the first direction, and
wherein the opposite end of the flexible printed circuit board is attached at a position on the bottom surface of the first sub-digitizer that is a one-half position of the width of the first sub-digitizer in the first direction.

14. The display device of claim 2, wherein the display panel further comprises a second sliding area adjacent to the flat area and configured to slide in a direction opposite to the first direction, wherein the flat area is disposed between the first sliding area and the second sliding area,
- wherein the display device further comprises: a second sub-digitizer disposed on the main digitizer and spaced apart from the first sub-digitizer in the first direction, and
- wherein the second sub-digitizer is configured to move in the direction opposite to the first direction in accordance with a sliding behavior of the second sliding area.

15. A display device comprising:
- a display panel comprising a first area and a second area adjacent to the first area in a first direction and configured to slide in the first direction;
- a main digitizer disposed under the first area of the display panel;
- a sub-digitizer disposed under the main digitizer and partially overlapping with the main digitizer in a thickness direction;
- a first connector attached to a first surface of the main digitizer; and
- a second connector attached to a first surface of the sub-digitizer,
- wherein the sub-digitizer is configured to slide in the first direction,
- wherein when the sub-digitizer slides in the first direction, the first connector and the second connector come into direct contact with each other so that the main digitizer and the sub-digitizer are electrically connected with each other.

16. The display device of claim 15, wherein the sub-digitizer is configured to move in accordance with a sliding behavior of the second area.

17. The display device of claim 16, wherein when the sub-digitizer moves in the first direction in accordance with the sliding behavior of the second area, the sub-digitizer is disposed on a first surface of the second area and partially overlaps with the second area, and
- wherein when the sub-digitizer moves in accordance with the sliding behavior of the second area, the first connector and the second connector are in direct contact with each other so that the main digitizer and the sub-digitizer are electrically connected with each other.

18. The display device of claim 17, wherein the second connector is wider in the first direction than the first connector.

19. The display device of claim 17, further comprising:
- a plurality of segments attached to the first surface of the second area of the display panel, wherein the segments are extended in a second direction intersecting the first direction and are spaced apart from one another.

20. The display device of claim 19, wherein each of the plurality of segments comprises a non-magnetic material.

\* \* \* \* \*